US011412069B1

(12) United States Patent
Maes et al.

(10) Patent No.: US 11,412,069 B1
(45) Date of Patent: Aug. 9, 2022

(54) APPLICATION CONFIGURATION

(71) Applicant: MICRO FOCUS LLC, Santa Clara, CA (US)

(72) Inventors: Stephane Herman Maes, Santa Clara, CA (US); Srikanth Natarajan, Fort Collins, CO (US); Frank Vosseler, Boeblingen (DE)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 17/178,688

(22) Filed: Feb. 18, 2021

(51) Int. Cl.
*H04L 67/51* (2022.01)
*H04L 67/306* (2022.01)
*H04L 9/40* (2022.01)
*H04L 67/00* (2022.01)
*H04L 67/566* (2022.01)

(52) U.S. Cl.
CPC ............ *H04L 67/51* (2022.05); *H04L 63/102* (2013.01); *H04L 67/306* (2013.01); *H04L 67/34* (2013.01); *H04L 67/566* (2022.05)

(58) Field of Classification Search
CPC ... H04L 63/102; H04L 67/16; H04L 67/2833; H04L 67/306; H04L 67/34
USPC .......................................................... 709/223
See application file for complete search history.

(56) References Cited

U.S. PATENT DOCUMENTS 9,578,063 B1* 2/2017 Iyer ..................... G06F 9/45558
2003/0229783 A1* 12/2003 Hardt ..................... H04L 63/102
713/155

* cited by examiner

*Primary Examiner* — Wing F Chan
*Assistant Examiner* — Leon Y Tseng

(57) ABSTRACT

An application managed by a provider is configured to run according to a selected usage scenario of a group of usage scenarios. The group of usage scenarios include a hard-partitioned usage scenario in which instances of the application are hard partitioned in correspondence with tenants of the provider. The group of usage scenarios include a soft-partitioned usage scenario in which the instances of the application are soft partitioned in correspondence with the tenants of the provider. The configured application is executed.

20 Claims, 11 Drawing Sheets

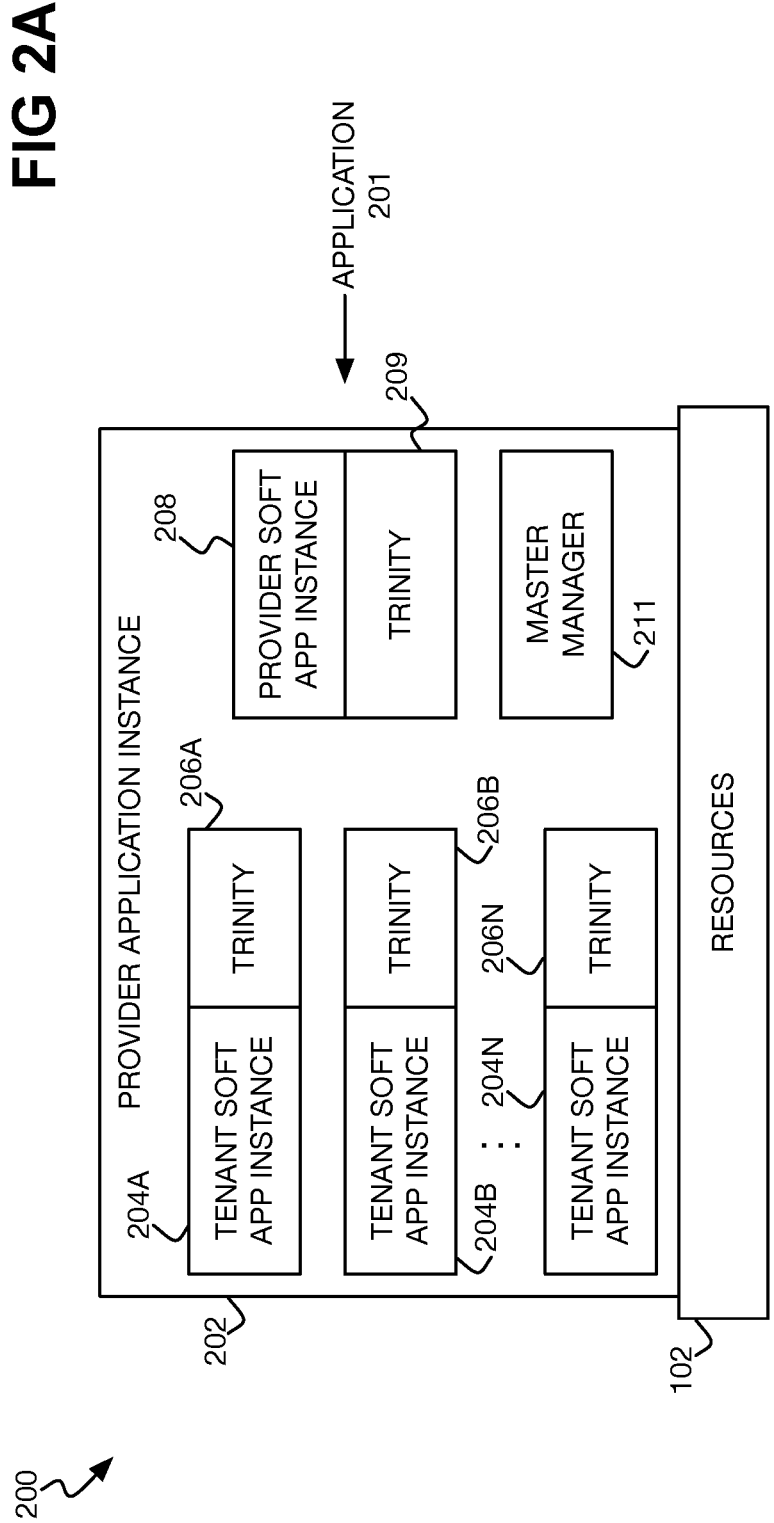

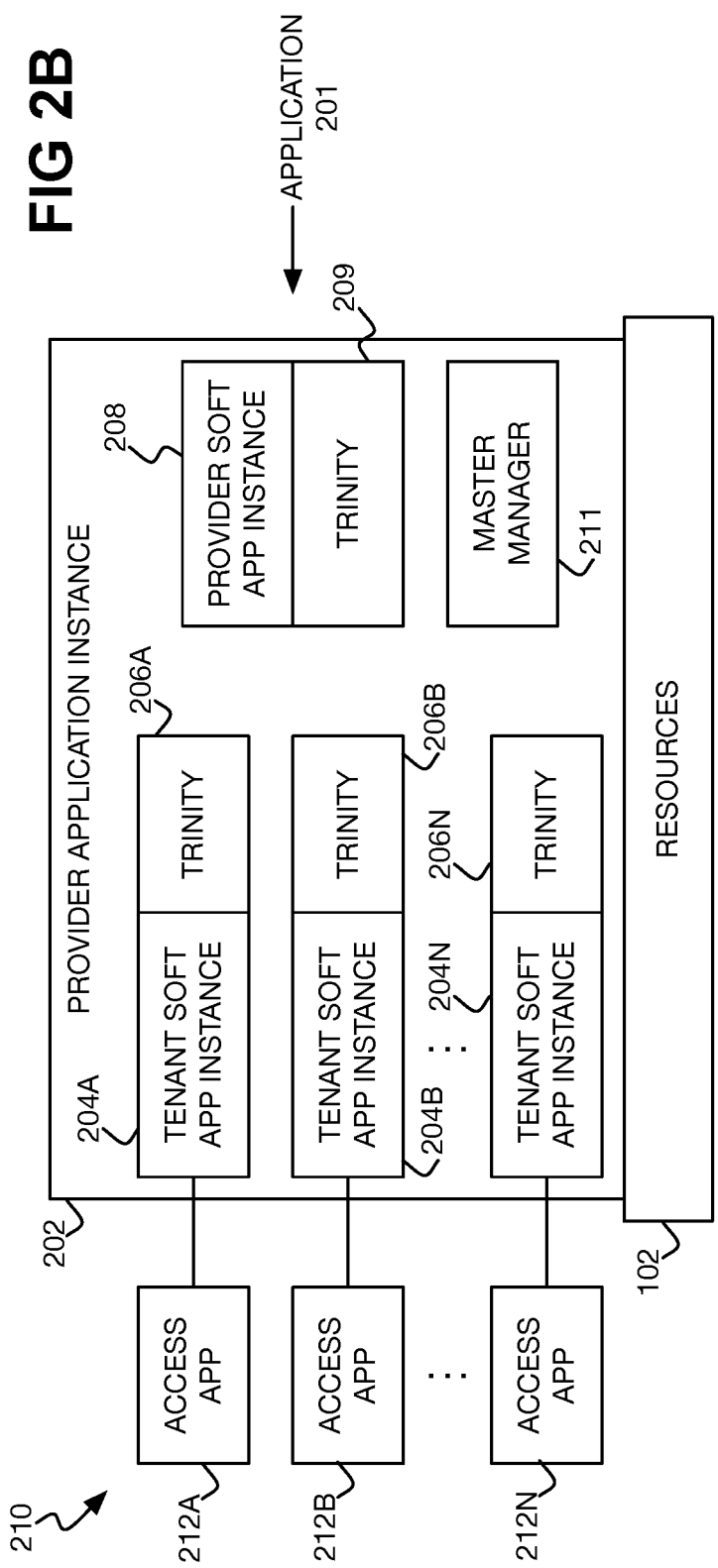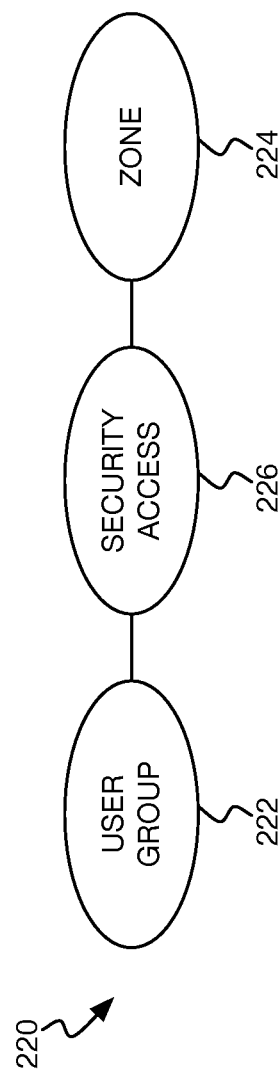

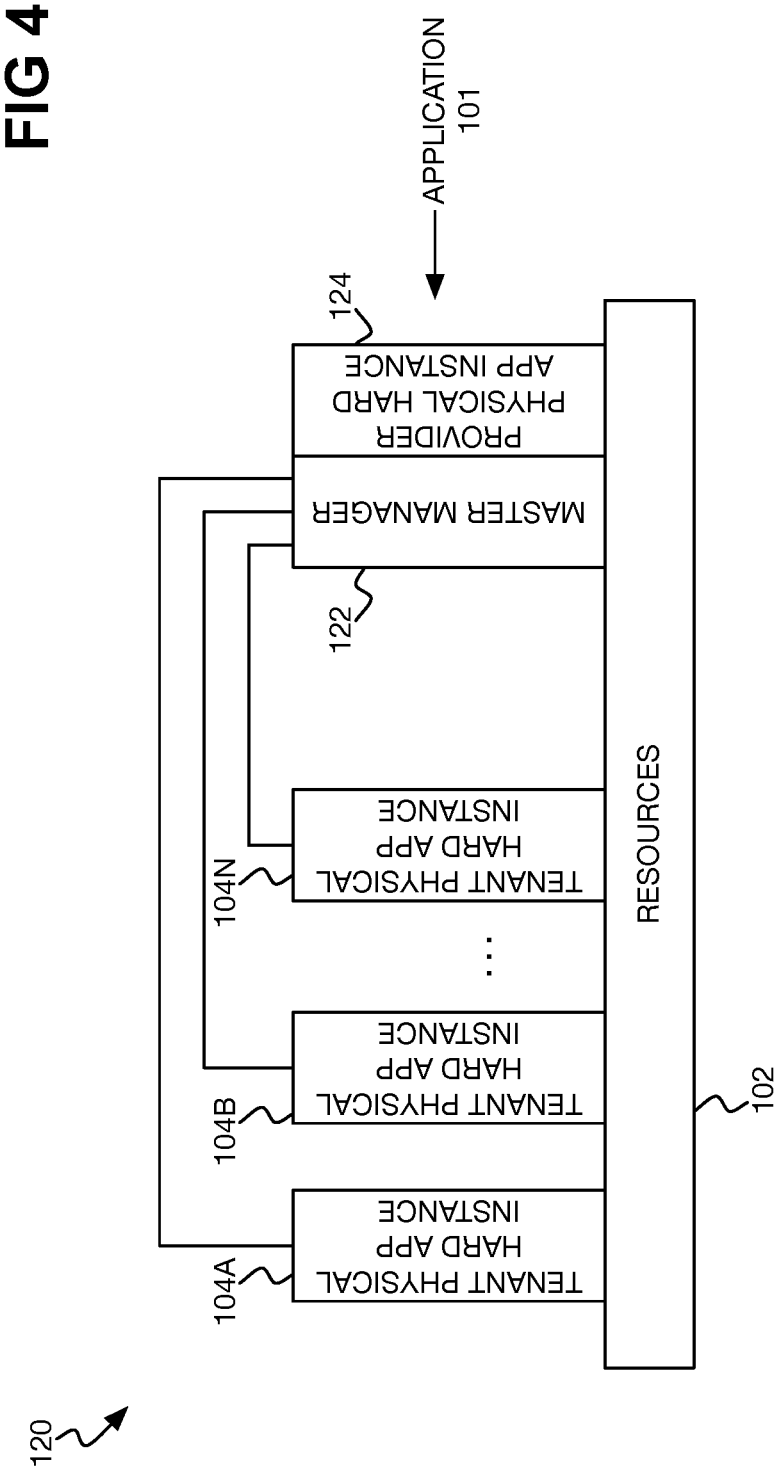

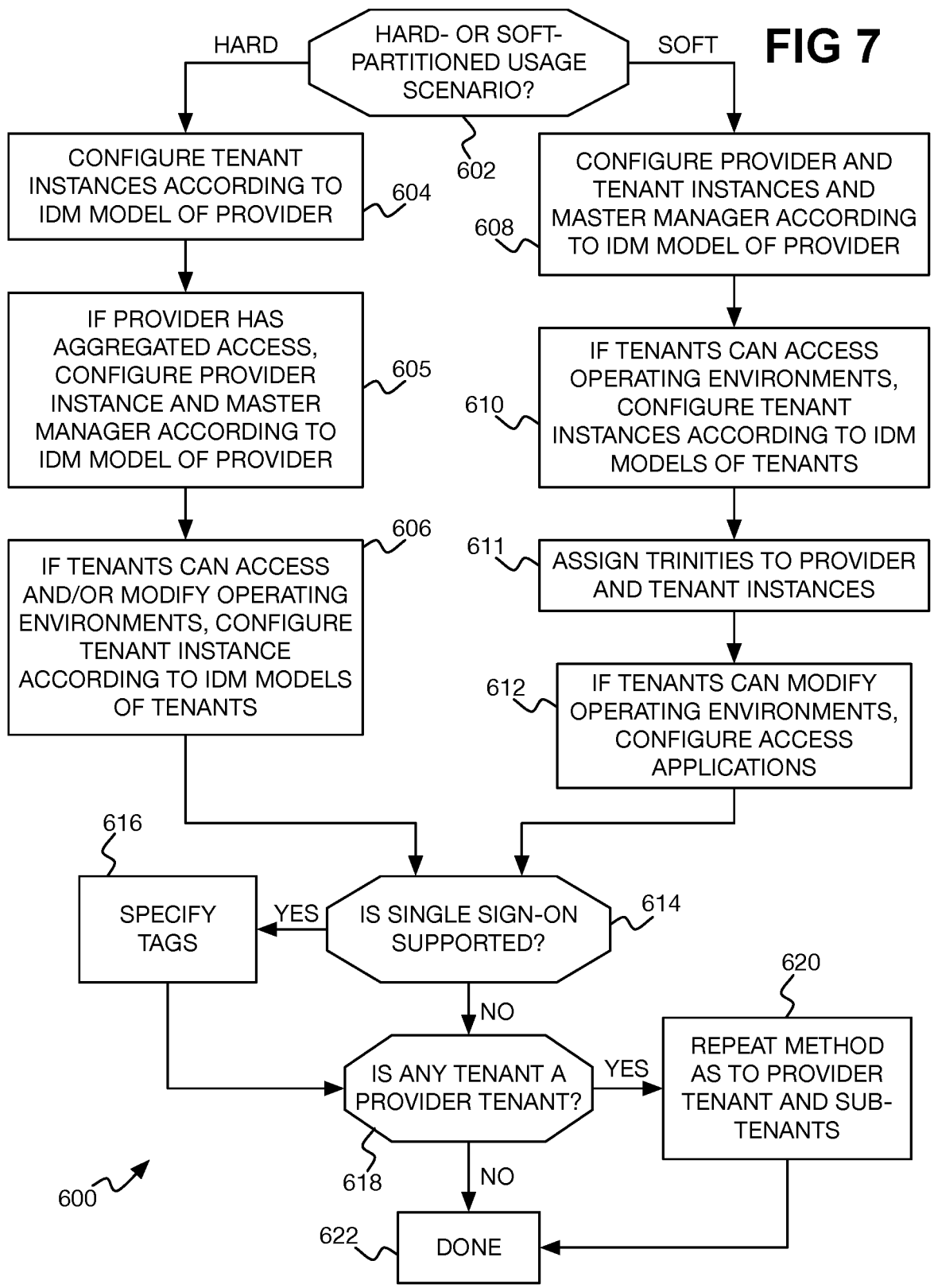

APPLICATION CONFIGURATION

BACKGROUND

Traditionally an application computer program, which is referred to herein simply as an application, has been deployed and managed on-premises on the computing resources of the entity for which the application is run. Such an application may be a legacy application, for instance, and the entity for which the application is run—such as an enterprise—can be referred to as the sole or single tenant of the application. Such a single tenant may be also be hosted on a public or private cloud, and regardless of whether the application is deployed on-premises or in-cloud, can be managed by a managed services provider (MSP) or used by the MSP to manage the customer's environment.

More recently, applications have been developed that can have multiple tenants, such as different subsidiaries, business departments, groups, and so on, of the same enterprise or other entity in the case in which the application is hosted on-premises. Multi-tenancy applications can also be hosted on the cloud—i.e., on computing resources accessible over a network like the Internet—via a software-as-a-service (SaaS) provider. Different enterprises and other entities that have no relationship among themselves may be the customers of a SaaS provider. Such different entities can thus be the multiple tenants of a SaaS provider-managed application. The application may be developed by the SaaS provider itself or by another vendor that the SaaS provider resells.

By comparison, an MSP also typically manages the environment of a customer or tenant, on behalf of that customer or tenant, including the tenant's hardware infrastructure as well as its applications—which may be on-premises, on the cloud, or provided as SaaS—and other devices or systems of the customers, such as employee devices, and so on. In this respect, MSP customers like enterprises may outsource their information technology (IT) departments to MSPs. MSPs can thus host, use, or provide applications for its tenants in the context of services that go beyond SaaS. To achieve this efficiently, an MSP may leverage its own applications to manage the environments of multiple customers, instead of using each customer's own management tools and applications that may differ for each customer.

BRIEF DESCRIPTION OF THE DRAWINGS

FIGS. 2A and 2B are diagrams of example soft-partitioned usage scenarios of an application.

FIG. 3 is a diagram of an example trinity by which a tenant soft instance of an application is governed in the soft-partitioned usage scenarios of FIGS. 2A and 2B.

FIG. 4 is a diagram of an additional example hard-partitioned usage scenario of an application.

FIG. 7 is a flowchart of an example method for configuring an application in accordance with a selected usage scenario.

DETAILED DESCRIPTION

As noted in the background, an application may have one or multiple tenants, and may be hosted on-premises or on the cloud, the latter via a software-as-a-service (SaaS) provider or a managed services provider (MSP). The application may be managed by an entity like an enterprise in the case in which the application is hosted on premises, on the cloud by the enterprise, or on the cloud by a SaaS provider such that the entity is a tenant of the application. The application may instead be hosted on the cloud and used by an MSP to manage operating environments on behalf of entities that are tenants of the application. That is, an MSP can manage its tenants' operating environments that each include the application, and can leverage SaaS or on-premises applications to manage these environments.

Problematically, however, there is currently no easy way for an application to be configured so that it can be used in any of these ways or use cases without rearchitecting the application, or offering different versions of the application for each use case. For example, most legacy applications cannot be easily (e.g., safely and/or efficiently) configured for multi-tenancy, even if hosted on premises. Applications ordinarily hosted by SaaS providers cannot be easily configured for usage in the context of operating environments that MSPs manage on behalf of their tenants.

Such limitations thus make it difficult at best to offer application hosting (including on demand) and management solutions that are use case-agnostic (e.g., usage by an enterprise as the sole tenant or one of multiple tenants, usage by a SaaS provider, usage by an MSP, and so on). A developer of a (legacy) single tenant application is not easily able to offer the application to SaaS providers and MSPs to provide to tenants. Similarly, an MSP may not be able to rely on a SaaS provider-developed application (or a third party-developed application offered as a SaaS by an MSP) to efficiently manage its tenants' environments. The end result is less diverse application offerings in the realm of SaaS and MSP, and/or increased cost to develop different versions of the application for different use cases, train users of the applications, and so on.

Techniques described herein provide for development or configuration of an application so that it can be used in a variety of different use cases (i.e., usage scenarios), without having to rearchitect the application or develop different versions. The techniques can employ a hierarchical identity management (IDM) model that itself leverages the IDM models of tenants of the provider. As such, regardless of whether an application is to be hosted on-premises or on the cloud, and is to be used by a single tenant, by a tenant in the context of a SaaS provider-hosted application, or by an MSP to manage the environments of its customers (i.e., tenants), the techniques permit the application to be configured accordingly.

Figure 1A:
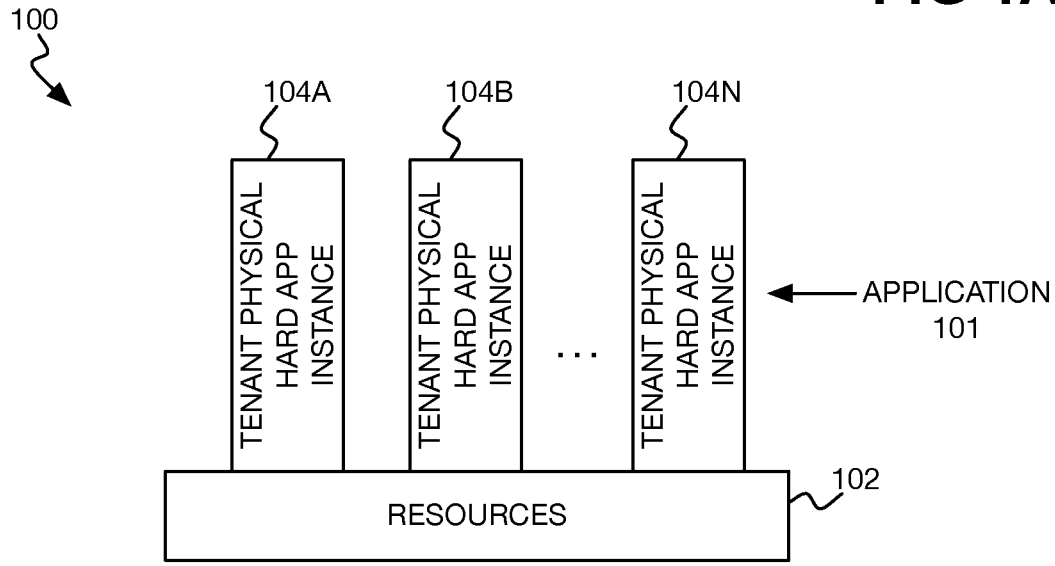
FIGS. 1A and 1B are diagrams of example hard-partitioned usage scenarios of an application.
Figure 1B:
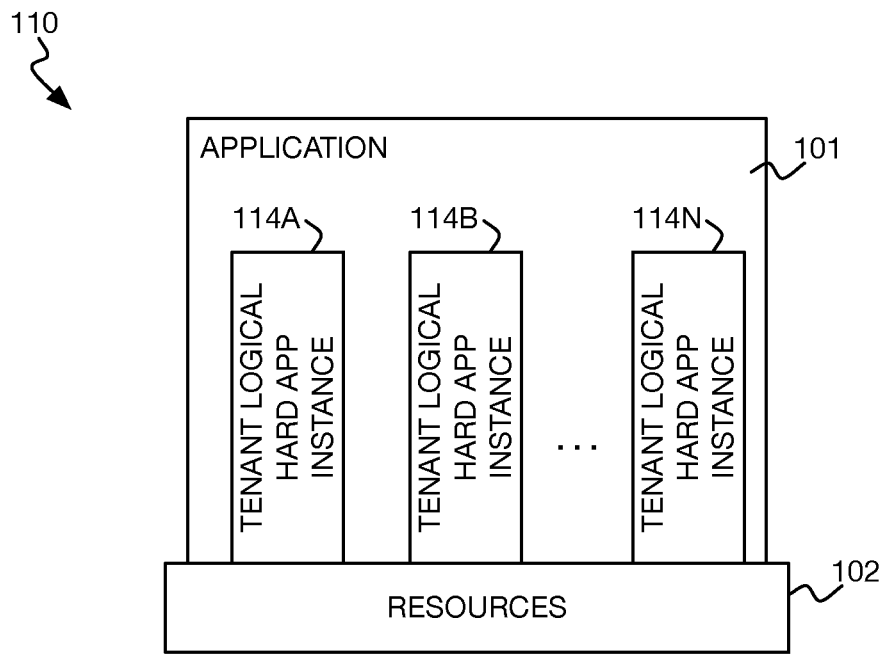

FIGS. 1A and 1B show example hard-partitioned usage scenarios 100 and 110 of an application 101, respectively. In both usage scenarios 100 and 110, the application 101 is hard partitioned on underlying resources 102, which are computing resources such as processors, memory, storage devices, and other hardware as well as software resources. The resources 102 may be shared resources, on the premises of a provider, or may be on the cloud in the case in which the provider is a customer of an infrastructure-as-a-service (IaaS) provider that hosts the resources 102 online and thus accessible over a network such as the Internet. The resources 102 may instead be dedicated resources, including a dedicated software stack if desired or sufficient.

In the hard-partitioned usage scenario 100 of FIG. 1A, the application 101 is hard partitioned over physical hard application instances 104A, 104B, ..., 104N for the respective tenants of the application. The physical hard application instances 104A, 104B, ..., 104N can be collectively referred to as the physical hard application instances 104. The physical hard application instances 104 are tenant physical hard application instances in that each physical hard application instance 104 corresponds to a tenant of the provider. The application 101 in the usage scenario 100 is thus in effect repeated in the collection or set of the physical hard application instances 104, where each instance 104 is a separate copy of the application 101.

In the hard-partitioned usage scenario 110 of FIG. 1B, the application 101 is hard partitioned over logical hard application instances 114A, 114B, ..., 114N for the respective tenants of the application. The logical hard application instances 114A, 114B, ..., 114N can be collectively referred to as logical hard application instances 114. The logical hard application instances 114 are tenant logical hard application instances in that each logical hard application instance 104 corresponds to a tenant of the provider. The application 101 in the usage scenario 110 is thus a single copy of the application 101 that has multi-tenancy support built in. Each logical hard application instance 114 is limited to its corresponding tenant. Therefore, whereas the application 101 logically appears as separate logical hard application instances 114 to respective tenants, but there is just one copy of the application 101.

A difference between the physical hard application instances 104 in the hard-partitioned usage scenario 100 and the logical hard application instances 114 in the hard-partitioned usage scenario 110 thus lies in how the application 101 is hard partitioned into the instances 104 and 114, which can lead to better efficiencies and/or decrease cost for the provider. The trade-off may be that a logically (or virtually) hard partitioned application is more resource and/or cost efficient to run, but is more difficult to develop than a physically hard partitioned application. If the application 101 has been developed as a multi-tenancy application, the application 101 can be hard-partitioned into logical hard application instances 114 via the internal logic of the application 101 itself. That is, although the application instances 114 are hard partitions, the partitioning is achieved within and by the application 101 itself.

By comparison, if the application 101 has not been developed as a multi-tenancy application, the application 101 has to be hard-partitioned into physical hard application instances 104. That is, each application instance 104 is in a separate copy of the application 101 in its entirety, as noted above. The physical hard-partitioned usage scenario 100 is thus more resource intensive than the logical hard-partitioned usage scenario 110, but is usable for applications that do not have multi-tenancy logic.

In either usage scenario 100 or 110, the partitioning of the application into instances 104 or 114 for respective tenants of the application 101 is considered a hard partitioning as follows. Data accessible in any instance 104 or 114 by a tenant is not accessible in any other instance 104 or 114 by any other tenant. Data, in other words, is well segregated among the instances 104 and 114, even though the instances 104 and 114 have the same underlying resources 102.

Hard partitioning can also mean that performance of usage of any instance 104 or 114 is independent of usage of any other instance 104 or 114. Such performance may be mandated by differing service level agreements (SLAs) for the tenants. SLA enforcement on a per-instance basis can be achieved in the usage scenario 100 by ensuring that there are sufficient resources 102 to support the physical hard application instances 104. By comparison, in the usage scenario 110, the application 101 itself can enforce SLAs, since the instances 114 are logical hard application instances.

In context of either hard-partitioned usage scenario 100 or 110, the provider may be an entity, such as enterprise. In this case, the tenants having the respective instances 104 or 114 are different units, such as different subsidiaries, business departments, and so on, of the entity. The application 101 may be a legacy application that does not have multi-tenancy support, in which case the usage scenario 100 is employed, or may be an application that does have multi-tenancy support, in which case the usage scenario 110 is employed.

In another example, the provider in the context of the hard-partitioned usage scenario 100 or 110 may be a SaaS provider. In this case, the tenants having the respective instances 104 or 114 are different customers of the SaaS provider, such as different enterprises or other entities (or units of the same entity). The SaaS provider may have developed the application 101 itself, and in this case the provider is likely to have developed the application 101 to have multi-tenancy support, in which case the usage scenario 110 is employed. However, the SaaS provider could have also developed the application 101 without multi-tenancy support, in which case the usage scenario 100 is employed.

As a third example, the SaaS provider in the context of either hard-partitioned usage scenario 100 or 110 may instead be offering a third party-developed application 101 as a SaaS. Similar to the prior example, the tenants having the respective instances 104 or 114 are different customers of the provider, such as different enterprises or other entities (or units of the same entity). If the application 101 does not have multi-tenancy support, the usage scenario 100 is used, and if the application 101 has multi-tenancy support, the usage scenario 110 is used.

FIG. 2A shows an example soft-partitioned usage scenario 200 of an application 201. The application 201 is soft partitioned on underlying resources 102, which as in the hard-partitioned usage scenarios are computing resources such as processors, memory, storage devices, and other hardware as well as software resources. The soft partitioning of FIG. 2A may also be referred to as weak partitioning. Such partitioning generally occurs in the context of an MSP that manages operating environments on behalf of its tenants, which may be customers of the MSP. As in the hard-partitioned usage scenarios, in the soft-partitioned usage scenario 200 the application 201 is more generally soft partitioned on underlying resources that may be shared or dedicated.

In the usage scenario 200, there is an overall application instance 202 of the provider, which is referred to as the provider application instance, and which effectively constitutes the application 201. The application 201 (i.e., the overall application instance 202) is soft partitioned over soft application instances 204A, 204B, ..., 204N for respective tenants of the provider, and which can be collectively referred to as soft application instances 204. The soft application instances 204 are tenant soft application instances in that each soft application instance 204 corresponds to a respective tenant of the provider.

The soft application instances 204 permit users of the provider (and in some instances, the users of the tenants) to manage the operating environments of its tenants to which the instances 204 correspond. An operating environment includes the software and hardware resources of a tenant or used by a tenant. The operating environment can be or include an information technology (IT) environment of a tenant, for instance.

The soft, or weak, partitioning in the usage scenario 200 differs from the hard-partitioned usage scenarios that have been described at least in that it is architected from the start so that the provider has access to the soft application instances 204 of the tenants, since the provider manages the operating environments of the tenants via the instances 204. For instance, the provider can, as the provider, switch between soft application instances 204 of different tenants, and may be able to view the instances 204 globally in aggregated form, as is described later in the detailed description. This provides for the MSP with efficiency, in that an MSP managing multiple tenant environments can have views and the ability to execute actions on these environments without having to log into and out of each environment.

The soft application instances 204 should therefore be virtual, and are not, for example, actual (physical or logical) hard instances of the application 201 (i.e., the overall provider application instance 202). An MSP can thus leverage the instance 202 of its own application 201 to manage a large set of tenants (e.g., customer) environments via respective tenant soft application instances 204. The usage scenario 200 may therefore be referred to as a leveraged model.

Soft partitioning in the usage scenario 200 is effectively achieved by defining the soft application instances 204 and assigning respective trinities 206A, 206B, . . . , 206N, to the application instances 204. The trinities 206A, 206B, . . . , 206N are collectively referred to as the trinities 206. An example trinity 206 is described in detail later in the detailed description. In general, a trinity 206 is a way by which role-based access control (RBAC) is effected for a corresponding soft application instance 204 for appropriately permitting the users of the provider (e.g., the MSP) to manage the operating environment of the tenant in question. That is, each trinity 206 defines how (and which) users of the provider can access the operating environment of a respective tenant via the corresponding tenant soft application instance 204, as to the actions these users are permitted to perform in relation to the operating environment, for instance.

As in the hard-partitioned usage scenarios, data is segregated and not shared across the application instances 204 in the soft-partitioned usage scenario 200. However, data is accessible by authorized users of the provider through the soft application instances 208 as specified by the trinities 206. The usage scenario 200 may further include a master manager 211 that is part of the overall provider application instance 202 itself, by which data of multiple application instances 204 can be displayed within an aggregated view, via common reports or dashboards, to a user of the MSP (to the extent that this user has access to the data per the RBAC for the security group of the user for the data of the domain as specified in trinities 206). The master manager 211 is a software component or functionality of the application 201 in this respect, and is an implicit part of an application 201 that can be soft partitioned when present. However, the master manager 211 is a convenience and efficiency for the users of the provider, and in some implementations may not be present.

The application 201 (i.e., the overall provider application instance 202) may also be soft partitioned over a provider soft application instance 208 by which users of the provider manage the overall operating environment of the provider itself. The provider soft application instance 208 is thus similar to the tenant soft application instances 204, but whereas each tenant soft application instance permits users of the provider to manage a corresponding tenant's operating environment, the provider soft application instance 208 permits these users to manage the operating environment of the provider itself. A trinity 209 can thus be assigned to the provider soft application instance 208 to govern how (and which) users of the provider can access the provider's operating environment, similar to how a trinity 206 is assigned to each tenant soft application instance 204.

Unlike in the hard-partitioned usage scenarios, though, overall performance in the soft-partitioned usage scenario 200 may not be governed by SLAs that specify per-tenant application performance. Rather, the SLAs for the tenants may instead specify performance with respect to downtime, response time, and so on, of the operating environments managed via their respective soft application instances 204. SLA enforcement is thus different in the soft-partitioned usage scenario 200, since there are no concerns about usage of a soft application instance 204 by one tenant precluding usage of another soft application instance 204 by another tenant.

Ultimately, the soft-partitioned usage scenario 200 is predicated on provider management of the operating environments of the tenants per the trinities 206 of the soft application instances 204 on behalf of their respective tenants. The tenants delegate management of their operating environments to the provider in the particular usage scenario 200 of FIG. 2A. That is, in the usage scenario 200 specifically shown in FIG. 2A, the tenants are unable to access (i.e., read) or modify (i.e., write) their operating environments via access to respective instances 204.

However, the usage of trinities 206 assigned to the soft application instances 204 can be extended to support read-only tenant access to the operating environments. That is, as has been described, the trinities 206 each specify how (and which) users of the provider can manage the operating environment of a corresponding tenant via the respective tenant soft application instance 204 (as well as manage the instance 204 itself). Furthermore, the trinities 206 can be used so that they each specify how (and which) users of a corresponding tenant can access the operating environment of that tenant via a respective soft application instance 204 (as well as access to the instance 204 itself).

In such a usage scenario, each trinity 206 is again specific to a tenant, but can pertain or specify both users of the provider and users of the tenant in question. For example, the trinity 206A specifies access of users of the tenant having the soft application instance 204A to the operating environment of that tenant via the instance 204A, as well as access of users of the provider to the operating environment via the instance 204A. The trinity 206B similarly specifies access of users of the tenant having the soft application instance 204B to the operating environment of that tenant via the instance 204B, as well as access of users of the provider to the operating environment via the instance 204B, and so on. Each trinity 206 thus pertains to the users of the provider, and can also pertain to the users of a respective tenant.

The access that the trinities 206 afford to tenant users differs from the access that they afford to provider users, however. Each trinity 206 can permit users of the provider to both access and modify (i.e., manage, including both reading and writing) the operating environment via a respective soft application instance 204 (and the instance 204 itself). By comparison, each trinity 206 can permit users of a corresponding tenant to just access (i.e., have read-only access) to the operating environment via a respective soft application instance 204 (and to the instance 204 itself). This is achieved by security groups to which users are associated for specified target domains or zones.

Because the users of a tenant have at most (read-only) access to one corresponding tenant soft application instance 204, no trinity 206 permits aggregated access via the master manager 211. As noted, the master manager 211 provides for aggregated display of multiple application instances 204 to the extent that users of the provider are authorized via the respective trinities 206. No user of any tenant, however, is able to access the application instance 204 of any other tenant. Therefore, no trinity 206 permits aggregated display of multiple application instances 204, since the instances 204 correspond to different tenants.

Extending RBAC provided by the trinities 206 so that the users of the tenants can also via respective tenant soft application instances 204 modify (i.e., have write access) their operating environments may be problematic. Particularly, the risk of misconfiguring tenant modification rights may be considered too high to further extend the RBAC provided by the trinities 206 so that tenant users can modify their instances 204 and associated operating environments. Because of the soft-partitioned nature of the tenant instances 204, if tenant modification rights are misconfigured, a tenant may be able to manage the instance 204 of another tenant. Permitting read-and-write tenant user access so that users of the tenants can fully manage (i.e., both access and modify) their respective operating environments and soft application instances 204 can instead be provided in a different way, as is now described.

FIG. 2B shows another example soft-partitioned usage scenario 210 of an application 201. As in the soft-partitioned usage scenarios 200 of FIG. 2A, the application 201 is soft partitioned on underlying resources 102 in the soft-partitioned usage scenario 210. Within the overall application instance 202 of the provider, which constitutes the application 201, there are again tenant soft application instances 204 having respectively assigned trinities 206 by which users of the provider manage the operating environments of the tenants. Similarly, there is again a provider soft application instance 208 by which users of the provider manage its own operating environment as governed by an assigned trinity 209, as well as a master manager 211 by which the provider users have aggregated access to the tenant soft application instances 204. The master manager 211, as before, may not be present, however.

Additionally, as depicted in FIG. 2B, there are respective access applications 212A, 212B, . . . , 212N for the tenant instances 204, which are collectively referred to as the access applications 212. The access applications 212 may be considered as a proxy or other front-end component. The access applications 212 may be considered as customized hard-partitioned access applications for respective tenant instances 204. There may be a single such front end-component in this respect, instead of individual access applications 212 for respective tenant soft application instances 204.

The access applications 212 exist outside the overall provider application instance 202—and thus outside the application 201 itself—and expose interfaces to their respective tenant instances 204 and the operating environments that are managed by these instances 204. An access application 212 thus can provide read-and-write access of the operating environment of an associated tenant via a corresponding tenant instance 204, as well as read-and-write access to this instance 204 itself. (The access afforded by each access application 212 may instead, however, be just read-only access, and not both read-and-write access.)

Usage of access applications 212 to provide tenants with the ability to modify the operating environments and the tenant instances 204 can ensure that misconfiguration does not result in a tenant being able to modify the operating environment or the instance 204 of a different tenant. This is because the access applications 212 individually correspond to respective tenant instances 204. Therefore, if a given access application 212 is misconfigured, at worst the corresponding tenant will have more (or fewer) modification access rights to its own operating environment, and will still be unable to modify the operating environment of another tenant.

The access applications 212 can instead be configured to permit tenant users (or other applications on behalf of these users via application programming interfaces) to just access (i.e., have just read-only access to) their soft application instances 204 and operating environments. That is, instead of extending the trinities 206 to provide read-only tenant access as has been described in relation to FIG. 2A, the setup of FIG. 2B can be used to provide read-only tenant access. However, the setup of FIG. 2B can also be used to provide the usage scenario 210 in which tenants can modify (i.e., have both read-and-write access to) their instances 204 and operating environments.

FIG. 3 shows an example trinity 220 that can be used to implement RBAC of a corresponding tenant soft application instance 204 of the application 201 in FIGS. 2A and 2B. For example, the trinity 220 governs provider user access to a corresponding tenant instance 204 and the associated tenant operating environment. A given provider user may be specified in the trinities 220 of multiple tenant instances 204, to access the operating environments of the multiple respective tenants. The provider user may therefore have access to the master manager 211 if such functionality is present.

The trinity 220 can also govern (read-only) tenant user access to a corresponding tenant instance 204 and the associated tenant operating environment in the usage scenario in which the tenants have such read-only access to their environments. However, a given tenant user is specified in just one trinity 220, of the tenant instance 204 of the tenant in question, and thus has access to the operating environment of just this tenant and not any other tenant. The tenant user further does not have access to the master manage 211 if such functionality is present.

The trinity 220 specifically has three components: a user group 222, a zone 224, and security access 226. The user group 222 specifies a group of users, and specifies a part of the corresponding tenant instance 204 to which the users have access as defined by the security access 226. The zone 224 in this respect can vary for different implementations. For example, the zone 224 may specify one or multiple domains, devices, data centers, data sets, and so on, in the context of the tenant instance 204. The security access 226 may specify whether the users of the user group 222 have no, read-only, or both read-and-write access (i.e., the RBAC and permission for the zone 224).

The soft-partitioned usage scenarios that have been described provide for management of operating environments of tenants by users of the provider via soft application instances corresponding to the tenants. The users of the provider have aggregated access to the soft application instances insofar as their trinities allow. In the hard-partitioned usage scenarios that have been described, by comparison, users of the provider do not have aggregated access to the operating environments of the tenants, because the tenant instances are hard and not soft instances. Nevertheless, such aggregated access by providers users can be provided, as is now described.

FIG. 4 shows such an additional example hard-partitioned usage scenario 120 of the application 101. In the example, the application 101 is physically hard partitioned on underlying shared or dedicated resources 102 over physical hard application instances 104 for the respective tenants of the application 101 as in FIG. 1A. However, the application 101 may instead be logically hard partitioned over logical hard application instances as FIG. 1B. That is, the aggregated access described in relation to FIG. 4 is equally applicable to logical hard partitioning as it is to the explicitly shown physical hard partitioning.

In the hard-partitioned usage scenario 120, there is a physical hard application instance 124 for the provider. The users of the provider can manage the provider's operating environment via the hard application instance 124. However, the users of the provider can also have aggregated access to the tenant hard application instances 104, via a master manager 122 explicitly constructed for this purpose, even though providing such aggregated access is to some extent is antithetical to hard partitioning. This is in comparison to the master manager 211 in the soft-partitioned usage scenarios 200 and 210 of FIGS. 2A and 2B, in which the master manager 211 is part of the application 201 itself.

In all the hard- and soft-partitioned usage scenarios that have been described, application instances—be they soft or hard instances—are assigned to tenants. The application instances can be statically assigned to the tenants. That is, when the application is to be instantiated for a tenant, an application instance is created and assigned to the tenant. If the tenant no longer requires the application instance, the instance is accordingly deleted.

However, in what is referred to as a serverless model, the application instances—regardless of whether they are soft or hard instances—may be created without immediate assignment to the tenants. The instances may be placed in a pool of available instances. When processing is to be performed for a tenant, an available application instance is dynamically assigned to the tenant. The application instances may be stateful or stateless. For example, if stateful, previously saved instance state for the tenant is then loaded onto the instance, and the processing in question performed. Therefore, once the instance is no longer required by the tenant, the current state of the instance is then saved for the tenant. The instance is then unassigned from the tenant, and placed back into the pool where it can be subsequently dynamically assigned to the same or other tenant.

In addition, the hard- and soft-partitioned usage scenarios that have been described can be used in relation to the same application. That is, if the program code for an application supports soft partitioning, it can be deployed in any of the soft- and hard-partitioned usage scenarios that have been described. Different program code of the application itself is not needed to support different usage scenarios.

As has been described, a tenant is a customer of a provider in the case in which the provider is a SaaS provider or an MSP, or is a unit (e.g., subsidiary, business department, and so on) of the provider in the case in which the provider is an enterprise or other entity. However, a tenant may itself be a provider, and such a tenant is referred to as a provider tenant herein. For example, such a provider tenant can resell an application provided by a SaaS provider to its own customers. As another example, such a provider tenant can be an MSP that manages the operating environments of its own customers.

The hard- and soft-partitioned usage scenarios that have been described therefore can be further extended so that the application instance of the provider tenant is itself partitioned over application sub-instances for tenants of the provider tenant. The tenants of the provider tenant are referred to herein as sub-tenants. The further partitioning of an application instance of a provider tenant over application sub-instances of sub-tenants of the provider tenant is now described in detail.

Figure 5A:
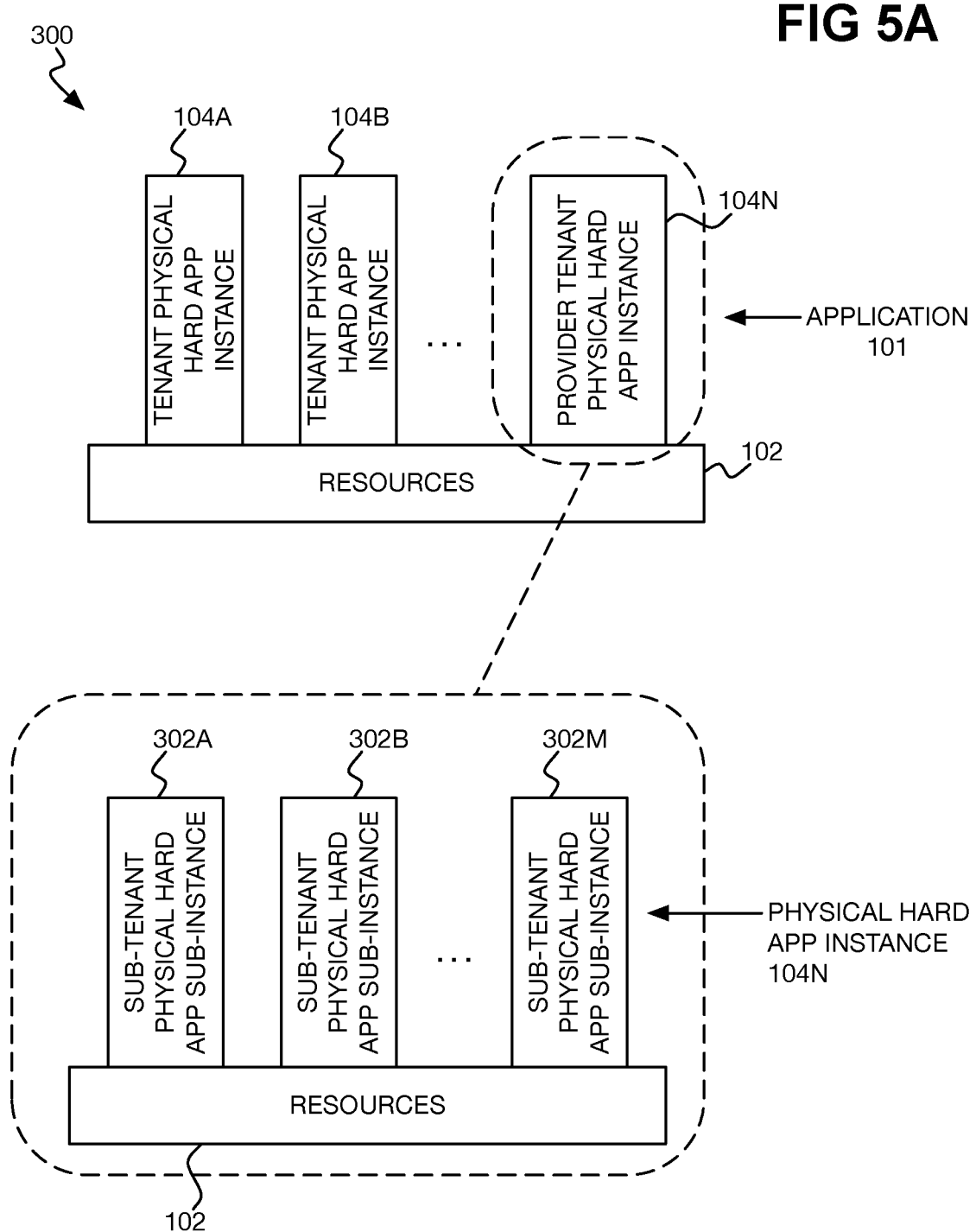
FIGS. 5A, 5B, and 5C are diagrams of example hard-partitioned usage scenarios of an application in which a tenant of the application is itself a provider.
Figure 5B:
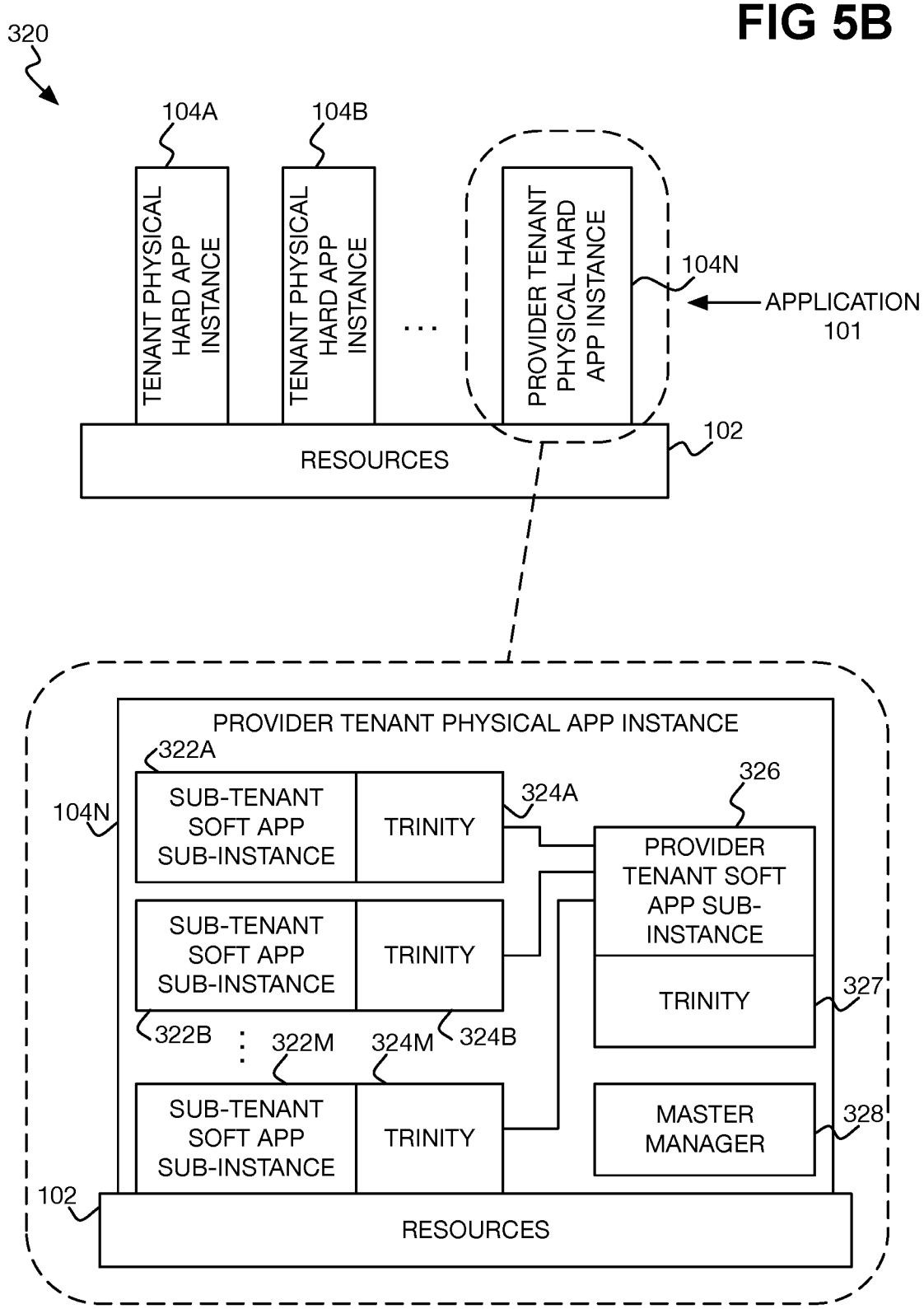

FIGS. 5A and 5B show example hard-partitioned usage scenarios 300 and 320 of an application 101, respectively, in which one of the tenants of the application 101 is a provider tenant. In the usage scenarios 300 and 320, the application 101 is hard partitioned on the underlying resources 102 over physical hard application instances 104 for the respective tenants of the application, as in the hard-partitioned usage scenario 100 of FIG. 1A. However, the application 101 may instead be hard partitioned over logical hard application instances, as in the hard-partitioned usage scenario 110 of FIG. 1B.

In both the usage scenarios 300 and 320 of FIGS. 5A and 5B, the tenant having the physical hard application instance 104N is itself also a provider having tenants. As noted above, the tenants of the provider tenant are referred to as sub-tenants to distinguish them from the tenants of the hard application instances 104. That is, the provider tenant is one tenant of the overall provider of the application 101, and the sub-tenants are each a tenant of the provider tenant. For example, the provider tenant may be an enterprise using an instance 104N of an application 101 that is provided by a SaaS provider, in which case the sub-tenants may be subsidiaries, business departments, or other units of the enterprise. As another example, the provider tenant may be a service provider that may manages or administers an application that is provided by a SaaS provider.

In the usage scenario 300 of FIG. 5A, the hard application instance 104N of the provider tenant is itself hard partitioned on the underlying resources 102 over physical hard application sub-instances 302A, 302B, . . . , 302M for the respective sub-tenants of the provider tenant. The physical hard application sub-instances 302A, 302B, . . . , 302M can be collectively referred to as the physical hard application sub-instances 302. The physical hard application sub-instances 302 are sub-tenant physical hard application sub-instances in that each physical hard application sub-instance 302 corresponds to a sub-tenant of the provider tenant.

The hard partitioning of the hard application instance 104N over physical hard application sub-instances 302 is thus similar to the hard partitioning of the application itself over physical hard application instances 104 in the usage scenario 100 of FIG. 1A. However, the hard application instance 104N may instead be hard partitioned over logical hard application sub-instances for the respective sub-tenants of the provider tenant, similar to the usage scenario 110 of FIG. 1B. The hard application instance 104N may also instead be soft partitioned over soft application sub-instances for the respective sub-tenants of the provider tenant, as is now described.

In the usage scenario 320 of FIG. 5B, the hard application instance 104N of the provider tenant is thus soft partitioned on the underlying resources 102 over soft application sub-instances 322A, 322B, . . . , 322M for the respective sub-tenants of the provider tenant. The soft application sub-instances 322A, 322B, . . . , 322M are collectively referred to as soft application sub-instances 322. The soft application sub-instances 322 are sub-tenant soft application sub-instances in that each soft application sub-instance 322 corresponds to a sub-tenant of the provider tenant.

The soft partitioning is effectively achieved by assignment of respective trinities 324A, 324B, . . . , 324M to the soft application sub-instances 322. The trinities 324A, 324B, . . . , 324M are collectively referred to as the trinities 324. Each trinity 324 is a way by which RBAC of the users of the provider tenant is effected for a corresponding soft application sub-instance 322, to accordingly permit the users of the provider tenant to manage the operating environment of the respective sub-tenant via the application sub-instance 322 in question. The soft partitioning of the hard application instance 104N into soft application sub-instances 322 is thus similar to soft partitioning of an application into application instances in the usage scenario 200 of FIG. 2A.

Therefore, in the usage scenario 320 of FIG. 5B, there can also be a soft application sub-instance 326 for the provider tenant itself, which is referred to as the provider tenant application sub-instance, and by or through which users (e.g., employees) of the provider tenant can manage the operating environment of the provider tenant. Access to the users of the provider tenant to the provider tenant soft application sub-instance 326 is thus accordingly specified by an associated trinity 327. Also similar to the usage scenario 200 of FIG. 2A, there can be a master manager 328 by which data of multiple sub-tenant soft application sub-instances 322 can be displayed in an aggregated manner to the users of the provider tenant.

The usage scenario 320 of FIG. 5B can further be extended so that sub-tenants of the provider tenant can access and/or modify their operating environments via the sub-tenant soft application sub-instances 322. For read-only such access, for instance, the soft partitioning of the hard application instance 104N can be extended so that trinities for the sub-tenants are respectively assigned to the sub-instances 322. For either read-only or read-and-write access, the soft partitioning of the hard application instance 104N can be extended so that access applications are respectively associated with the sub-instances 322.

FIGS. 5A and 5B therefore show how a hard application instance 104N into which an application has been hard partitioned (either physically or logically) can itself be partitioned into application sub-instances 302 or 322. In FIG. 5A, the hard application instance 104N is hard partitioned into (physical or logical) hard application sub-instances 302, whereas in FIG. 5B, the hard application instance 104N is soft partitioned into soft application sub-instances 322. A soft application instance into which an application has been soft partitioned can also be partitioned into application sub-instances, as is now described.

Figure 5C:
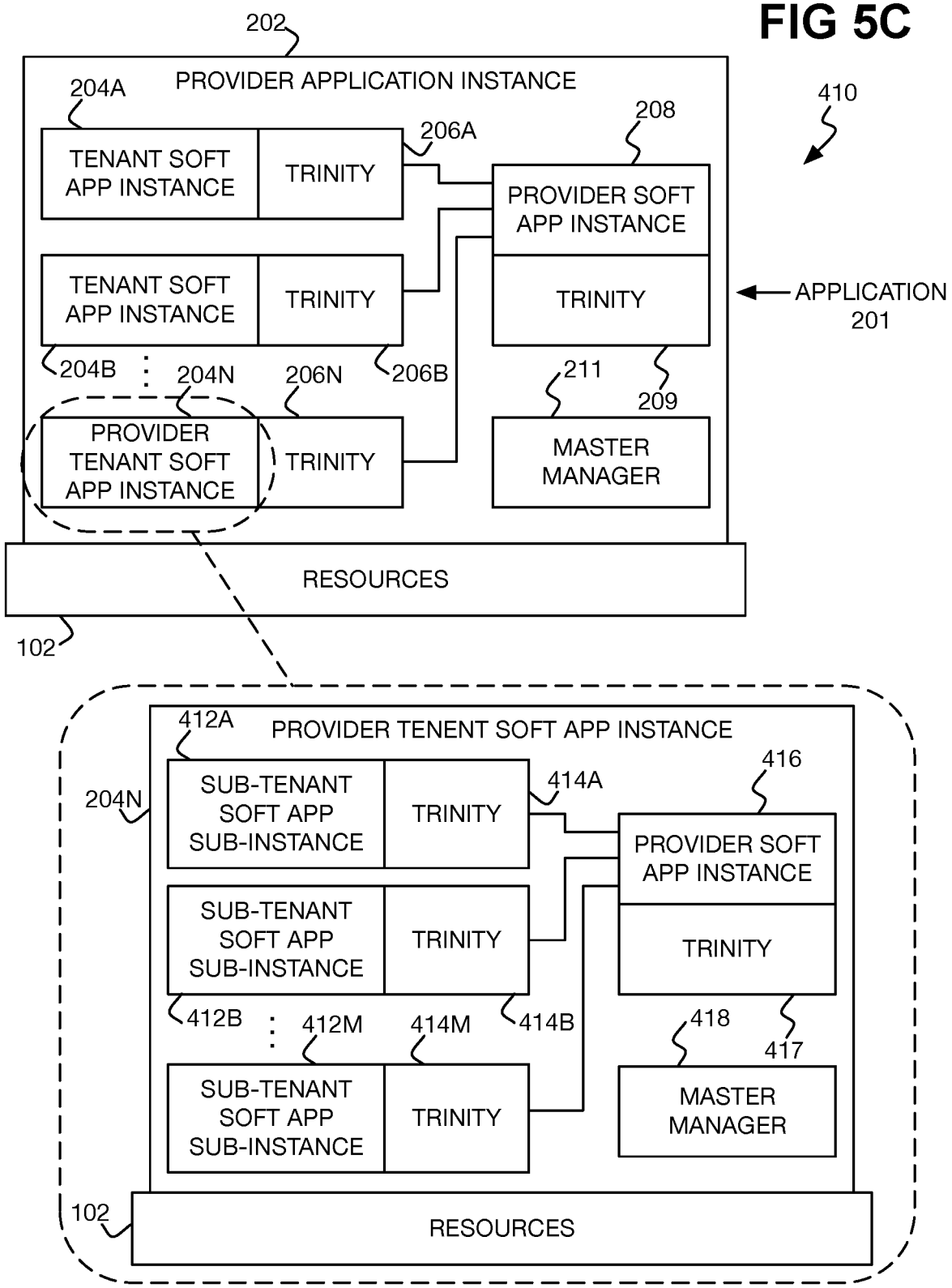

FIG. 5C shows an example soft-partitioned usage scenario 410 of an application 201 in which one of the tenants of the application is a provider tenant. In the usage scenario 410, the application is soft partitioned on the underlying resources 102 over soft application instances 204 for the respective tenants of the application, as in the soft-partitioned usage scenario 200 of FIG. 2A. There are thus trinities 206 by which RBAC is effected for respective soft application instance 204, as well as a provider soft application instance 208, an associated trinity 209, and a master manager 211, as has been described in relation to FIG. 2A. The soft partitioning of the application 201 in FIG. 5C may further support operating environment access and/or modification by the tenants themselves, as in the usage scenarios 200 and 210 of FIGS. 2A and 2B.

In the usage scenarios 410 of FIG. 5C, the tenant having the soft application instance 204N is itself also a provider having tenants. As has been noted, the tenants of the provider tenant are referred to as sub-tenants to distinguish them from the tenants of the soft application instances 204. That is, the provider tenant is one tenant of the overall provider of the application, and the sub-tenants are each a tenant of the provider tenant.

The soft application instance 204N of the provider tenant is specifically soft partitioned on the underlying resources 102 over soft application sub-instances 412A, 412B, . . . , 412M for the respective sub-tenants of the provider tenant. The soft application sub-instances 412A, 412B, . . . , 412M are collectively referred to as soft application sub-instances 412. The soft application sub-instances 412 are sub-tenant soft application sub-instances in that each soft application sub-instance 412 corresponds to a sub-tenant of the provider tenant.

The soft partitioning is effectively achieved by assignment of respective trinities 414A, 414B, . . . , 414M to the soft application sub-instances 412. The trinities 414A, 414B, . . . , 414M are collectively referred to as the trinities 414. Each trinity 414 is a way by which RBAC of the users of the provider tenant is effected for a corresponding soft application sub-instance 412, to accordingly permit the users of the provider tenant to manage the operating environment of the respective sub-tenant via the application sub-instance 412 in question. The soft partitioning of the soft application instance 204N into soft application sub-instances 412 is thus similar to soft partitioning of an application into application instances in the usage scenario 200 of FIG. 2A.

Therefore, in the usage scenario 410 of FIG. 5C, there can also be a soft application sub-instance 416 for the provider tenant itself, which is referred to as the provider tenant application sub-instance, and by or through which users (e.g., employees) of the provider tenant can manage the operating environment of the provider tenant. Access to the users of the provider tenant to the provider tenant soft application sub-instance 416 is specified by an associated trinity 417. Also similar to the usage scenario 200 of FIG. 2A, there can be a master manager 418 by which data of multiple sub-tenant soft application sub-instances 412 can be displayed in aggregated form to the users of the provider tenant.

The usage scenario 410 of FIG. 5C can further be extended so that sub-tenants of the provider tenant can access and/or modify their operating environments via the sub-tenant soft application sub-instances 412. For read-only access, additional trinities for the sub-tenants may be respectively assigned to the sub-instances 412, similar to FIG. 2B. For either read-only or read-and-write access, access applications can be respectively associated with the sub-instances 412.

FIG. 5C therefore shows how a soft application instance 204N into which an application 201 has been soft partitioned can itself be soft-partitioned into soft application sub-instances 412. Such soft partitioning of the soft application instance 204N is similar to soft partitioning the overall application 201. The soft application instance 204N could instead potentially be hard partitioned into hard application sub-instances, however.

It is noted that more than one tenant of the provider may be a provider tenant in FIGS. 5A, 5B, and 5C. Furthermore, a sub-tenant may itself be a provider. In such instance, the sub-tenant may be referred to as a tenant sub-provider and the tenants of the sub-tenant may be referred to as sub-sub-tenants. A sub-sub-tenant may itself be a provider, and so on. The usage scenarios of FIGS. 5A, 5B, and 5C can thus be extended to cover such cases.

For an application to be configured according to any of the usage scenarios that have been described, users have to be able to access the application instances consistent with the usage scenario in question. A provider can have an IDM model that specifies how provider users are authorized to use tenant application instances to manage operating environments of the tenants (as well as to use a provider application instance to manage the provider's operating environment), and that performs authentication of these users. In the case in which a tenant has access to its application instance, a tenant can also have an IDM model that specifies how its users are authorized to use the application instance to access the operating environment of that tenant. An IDM model may for each user define the user's credentials, such as a username (e.g., an email address) and a password.

In general, IDM is the organizational process for ensuring that users have appropriate access to technology resources (such as an application instance). IDM thus can include user identification, authentication, and authorization, such as via RBAC that may be set by application in that different applications can have different types of user roles. An IDM model is a model, or system, that effectuates IDM and can be facilitated by a separate identity provider (IDP) that may maintain an IDM repository like a lightweight directory access protocol (LDAP) repository. Examples of IDM models include the NetIQ Identity and Access Management (IAM) platform available from Micro Focus International plc, of Newbury, Berkshire, England. The techniques described herein specifically leverage IDM models of the provider and the tenants of the provider to permit an application to be configured according to any of the described usage scenarios, via integration of these IDM models within an overall hierarchical IDM model.

Figure 6A:
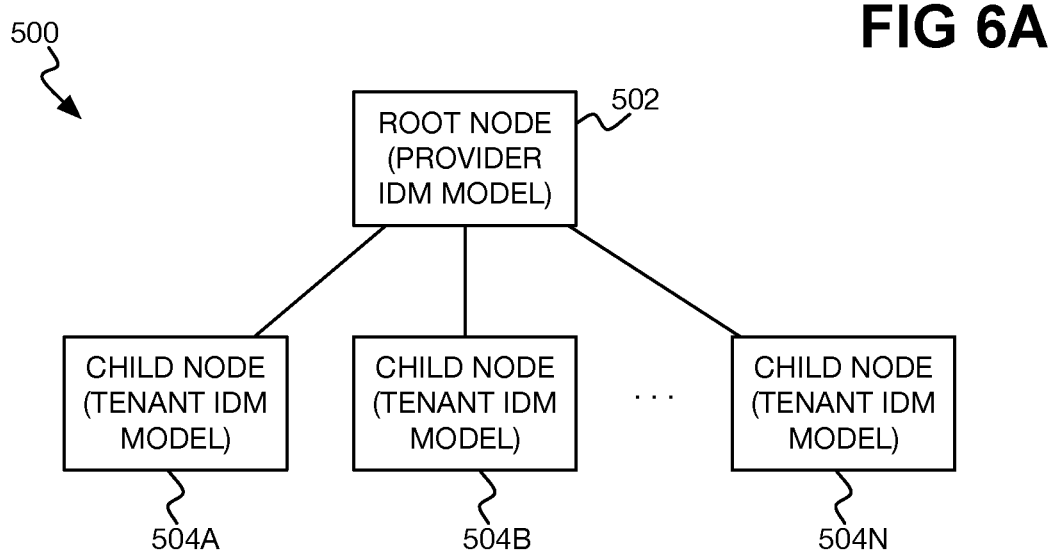
FIGS. 6A, 6B, and 6C are diagrams of example hierarchical identity management (IDM) models that supports both hard- and soft-partitioned usage scenarios.

FIG. 6A shows an example hierarchical IDM model 500 that supports both hard- and soft-partitioned usage scenarios of an application in which no tenant of the provider is itself a provider (i.e., a usage scenario in which there are no sub-tenants). The hierarchical IDM model 500 includes a root node 502 and child nodes 504A, 504B, . . . , 504N directly under the root node 502, and which are collectively referred to as the child nodes 504. The root node 502 corresponds to the provider of the application, whereas the child nodes 504 respectively correspond to the tenants of the provider.

The root node 502 includes the IDM model of the provider that specifies the users of the provider and their identification, authentication, and authorization. Therefore, the IDM model of the root node 502 specifies how the users of the provider are authenticated with respect to the overall application (i.e., the application instance of the provider), and how the users are authorized to access the application instances of the tenants of the provider. The IDM model of the root node 502 is independent of whether the application has been hard partitioned into physical or logical hard application instances, or has been soft partitioned into soft application instances.

Similarly, each child node 504 includes the IDM model of a respective tenant that specifies the users of the tenant and their identification, authentication, and authorization. Therefore, the IDM model of each child node 504 specifies how the users of a respective tenant are authenticated with respect to the application instance for the tenant in question, and how the users are authorized to access this application instance. The IDM models of the child nodes 504 are similarly independent of whether the application has been hard partitioned into physical or logical hard application instances, or has been soft partitioned into soft application instances.

The independence of the provider and tenant IDM models of the nodes 502 and 504 with respect to how the application is partitioned into instances thus permits the application to be configured in accordance with any of the hard- and soft-partitioned usage scenarios. That is, the hierarchical IDM model 500 is not specific to whether the application is soft or hard partitioned, and in the latter case, whether the application is hard partitioned into physical or logical hard instances. Once the application has been partitioned into application instances in accordance with a selected usage scenario, access to the application instances by users of the provider and the tenants is governed by the constituent IDM models of the nodes 502 and 504 of the hierarchical IDM model 500.

In the case in which an application has been soft-partitioned into soft application instances for the tenants, the trinities assigned to the soft application instances are populated as specified by the IDM models of the nodes 502 and 504 in accordance with the usage scenario in question. If just specified users of the provider have access to the tenant soft application instances, for instance, the provider IDM model of the root node 502 is used to populate the respective trinities, so that the trinities properly define user groups of provider users that are assigned RBAC for zones or domains. That is, the IDM model of the provider in this case specifies which provider users have access (and what type of access) to which tenant soft application instances, such that the trinities are accordingly populated.

If specified users of the tenants also have access to their respective soft application instances, the tenant IDM models of the child nodes 504 are further used to populate the trinities, so that the trinities also properly define user groups of tenant users that are assigned RBAC for zones or domains. Such trinity population is in addition to the trinity population in accordance with the provider IDM model of the root node 502. For example, the IDM model of a tenant in this case also specifies which users of this tenant have (read-only) access to the respective tenant soft application instance. The trinity for that tenant soft application instance is thus accordingly populated.

Figure 6B:
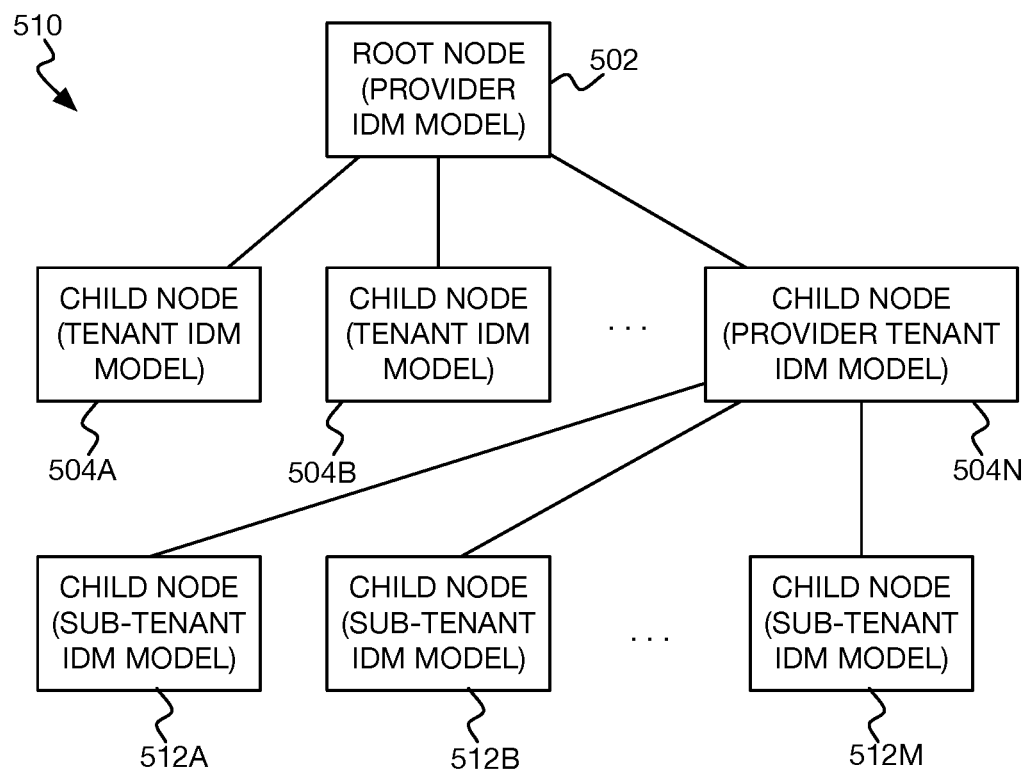

FIG. 6B shows another example hierarchical IDM model 510 that supports both hard- and soft-partitioned usage scenarios of an application. The hierarchical IDM model 510 extends the hierarchical model 500 of FIG. 5A in the case in which a tenant of the provider is itself a provider having tenants. That is, the hierarchical IDM model 510 pertains to the case in which a tenant of the provider is a provider tenant having sub-tenants. The hierarchical IDM model 510 again includes the root node 502 corresponding to the provider of the application, and the child nodes 504 directly under the root node 502 corresponding to the tenants of the provider.

The child node 504N of the hierarchical IDM model 510 specifically corresponds to a tenant of the provider that is a provider tenant having sub-tenants. Therefore, the hierarchical IDM model 510 includes child nodes 512A, 512B, . . . , 512M directly under the child node 504, and which are collectively referred to as the child nodes 512. The child nodes 512 respectively correspond to the sub-tenants of the provider tenant, and thus to application sub-instances.

As in the hierarchical IDM model 500 of FIG. 6A, the root node 502 of the hierarchical IDM model 510 of FIG. 6B includes the IDM model of the provider that specifies the users of the provider and their identification, authentication, and authorization with respect to the overall application and the application instances of the tenants of the provider. Also as in the hierarchical IDM model 500, each child node 504 of the hierarchical IDM model 510 includes the IDM model of a respective tenant that specifies the users of the tenant and their identification, authentication, and authorization with respect to the application instance of that tenant. The IDM models of the provider and the tenants are independent of how the application is partitioned into application instances. The trinities of the application instances are populated by the IDM models of the provider and the tenants as has been described above in relation to FIG. 6A.

In FIG. 6B, the IDM model of the provider tenant within the child node 504N further specifies the users of the provider tenant and their identification, authentication, and authorization as to how these users access the application sub-instances of the sub-tenants of the provider tenant. The IDM model of the child node 504N is independent of whether the application instance is a hard or soft application instance. Furthermore, the IDM model of the child node 504N is independent of whether the application instance has been hard or soft partitioned into hard or soft application sub-instances.

Similarly, each child node 512 includes the IDM model of a respective sub-tenant of the provider tenant that specifies the users of the sub-tenant and their identification, authentication, and authorization. Therefore, the IDM model of each child node 512 specifies how the users of a respective sub-tenant are authenticated with respect to the application sub-instance for the sub-tenant in question, and how the users are authorized to access this sub-instance. The IDM models of the child nodes 512 are similarly independent of whether the application instance has been hard or soft partitioned into hard or soft application sub-instances.

The independence of the provider, tenant, and sub-tenant IDM models of the nodes 502, 504, and 512 with respect to how the application is partitioned into instances and how an instance is partitioned into sub-instances thus permits the application to be configured in accordance with either of the usage scenarios 300, 320 and 410 of FIGS. 5A, 5B, and 5C, respectively. The hierarchical IDM model 510 is not specific to whether the application is soft or hard partitioned, nor to whether an application instance is soft or hard partitioned. Once the application has been partitioned into application instances and an application instance has been partitioned into sub-instances in accordance with a selected usage scenario, access to the application instances and sub-instances by users of the provider, the tenants, and the sub-tenants is governed by the constituent IDM models of the node 502, 504, and 512 of the hierarchical IDM model 510.

In the case in which a provider tenant application instance has been soft-partitioned into soft application sub-instances for the sub-tenants of the provider tenant, the trinities assigned to the sub-instances are populated as specified the IDM models of the nodes 504N and 512 in accordance with the usage scenario in question. If just users of the provider tenant have access to the sub-tenant soft application sub-instances, the tenant IDM model of the child node 504N is used to populate the respective trinities of the sub-instances. That is, the IDM model of the provider tenant in this case specifies which provider tenant users have access (and what type of access) to which sub-tenant soft application sub-instances, such that the trinities are accordingly populated.

If the users of the sub-tenants are also to have access to their respective soft application sub-instances, the sub-tenant IDM models of the child nodes 512 are further used to populate the trinities. Such trinity population is in addition to the trinity population in accordance with the provider tenant IDM model of the child node 504N. For example, the IDM model of a sub-tenant in this case also specifies which users of this sub-tenant have access to the respective sub-tenant soft application sub-instance. The trinity for that sub-tenant soft application sub-instance is thus accordingly populated.

It is noted that just child nodes 504 for provider tenants may themselves be permitted to have child nodes 512 for sub-tenants of the provider tenants. That is, a child node 504 that is for a tenant that is not a provider may not be permitted to have child nodes 512. In such a case, a tenant that is not a provider therefore cannot itself have tenants (i.e., sub-tenants).

As has been noted, a provider may be an entity such as an enterprise, in which case the tenants of the provider are subsidiaries, business departments, or other types of units of the entity. In this case, a user of one unit may be the same person as a user of another unit. That is, a user may have separate credentials at different units of the entity. Single sign-on (SSO) is a feature that ensures that a user does not have reenter his or her credentials when accessing the application instance of one unit after the user has already entered credentials to access the application instance of another unit.

Figure 6C:
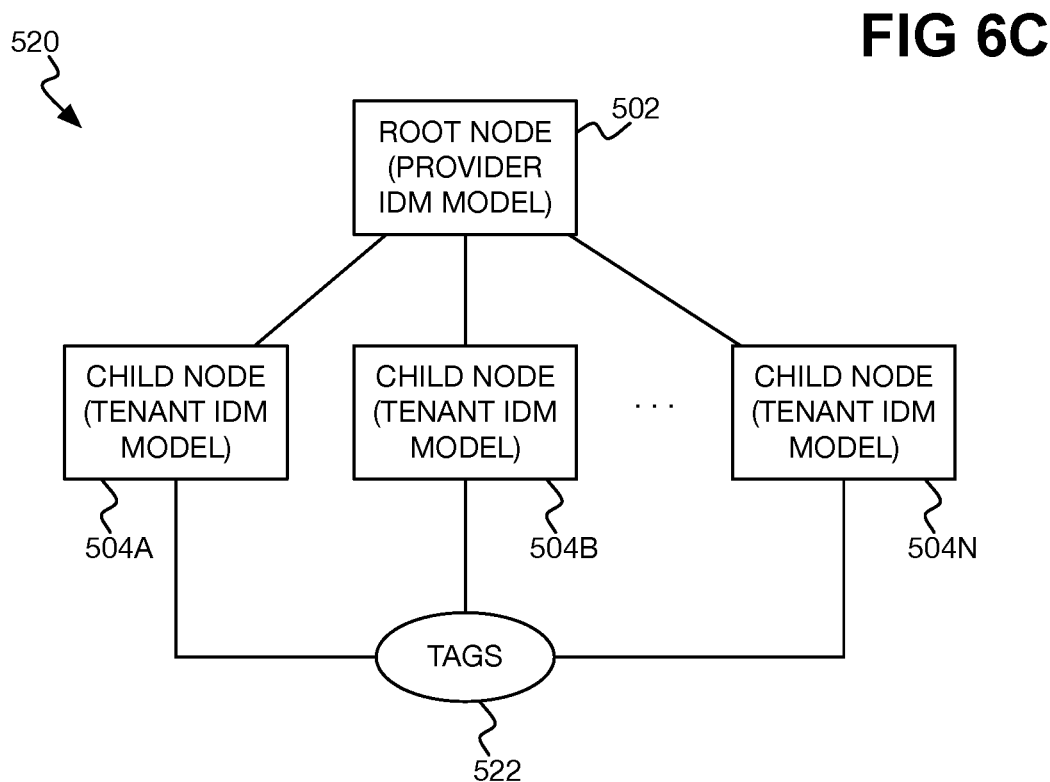

FIG. 6C shows an example hierarchical IDM model 520 that supports both hard- and soft-partitioned usage scenarios of an application, and that also supports SSO. The hierarchical IDM model 520 extends the hierarchical model 500 of FIG. 6A to support SSO. The hierarchical IDM model 520 again includes the root node 502 corresponding to the provider of the application and that includes the IDM model of the provider, and the child nodes 504 directly under the root node 502 corresponding to the tenants of the provider and that include the IDM models of the tenants.

The hierarchical model 520 further includes tags 522 associated with the IDM models of the tenants within the child nodes 504. Each tag 522 identifies an identical user among the IDM models of the tenants to support SSO. For example, a user may be identified by the same username in each of the IDM models of the child nodes 504. These usernames are tagged with the same tag 522 across the child nodes 504, which identifies that the usernames belong to the same user. Therefore, when a user has been authenticated against the IDM model of a given child node 504 to access the application instance corresponding to this child node 504, the user does not later have to be authenticated against the IDM model of a different child node 504 to access the application instance corresponding to this latter child node 504.

The usage of tags 522 in the hierarchical IDM model 520 thus permits the IDM model 520 to support SSO. The hierarchical IDM model 520 otherwise operates as the hierarchical model 500 of FIG. 5A does, as has been described. The hierarchical IDM model 510 of FIG. 5B, which supports usage scenarios in which an application instance is partitioned into application sub-instances, can similarly be extended to support SSO.

FIG. 7 shows an example method 600 for configuring an application in accordance with a selected hard- or soft-partitioned usage scenario using a hierarchical IDM model.

The method 600 may be implemented as program code stored on a non-transitory computer-readable data storage medium and executable by a processor. The processor may be part of a computing device or system that is used to deploy instances of the application for a provider on behalf of the tenants of the provider.

If the selected usage scenario is a hard-partitioned usage scenario (602), then the method 600 proceeds as follows. The method 600 includes configuring the tenant hard application instances according to the IDM model of the provider instance (604). If the provider is to have aggregated access to the tenant instances as in FIG. 4, then method 600 includes configuring a provider hard application instance and a master manager according to the IDM model of the provider instance as well (605). If the tenants are to have access to and/or be able to modify the operating environments via their application instances, then the method 600 also includes configuring the tenant hard application instances for such read-only or read-and-write access according to the IDM models of the tenant instances (606).

However, if the selected usage scenario is a soft-partitioned usage scenario (602), then the method 600 instead proceeds as follows. The method 600 includes configuring the provider and tenant soft application instances and a master manager according to the IDM model of the provider (608). If the tenants are to have read-only access to their operating environments, then the method 600 includes configuring the tenant soft application instances according to the IDM models of the tenants as well (610). The method 600 includes assigning trinities to the provider and tenant soft application instances (611), consistent with the access afforded by the IDM model of the provider, and the IDM models of the tenants if the tenants are to have access to their operating environments. Since the trinities govern access to respective tenant soft application instances, the trinities may themselves be leveraged from the IDM models of the provider and tenants.

If the tenants are further to be able to modify the operating environments, the method 600 includes also configuring access applications to provide such write access (612), as governed by the IDM models of the tenants. In this case, read access by the tenants to their operating environments may also be afforded by the access applications as governed by the IDM models of the tenants. Therefore, the trinities of the tenant soft application instances may not have to be configured using the IDM models of the tenants.

Regardless of whether the selected usage scenario is a hard- or soft-partitioned usage scenario, if SSO is to be supported (614), the method 600 includes then specifying tags that each identify an identical user across respective IDM models of the tenants (616). If any tenant is a provider tenant (618), the method 600 includes then repeating the method 600 as to each such provider tenant and its sub-tenants (620). In each such iteration, the method 600 is performed as to the application instance of a provider tenant and application sub-instances of the sub-tenants of this provider tenant. The method 600 is then completed (622), as is also the case if no tenant is a provider tenant (618).

Figure 8:
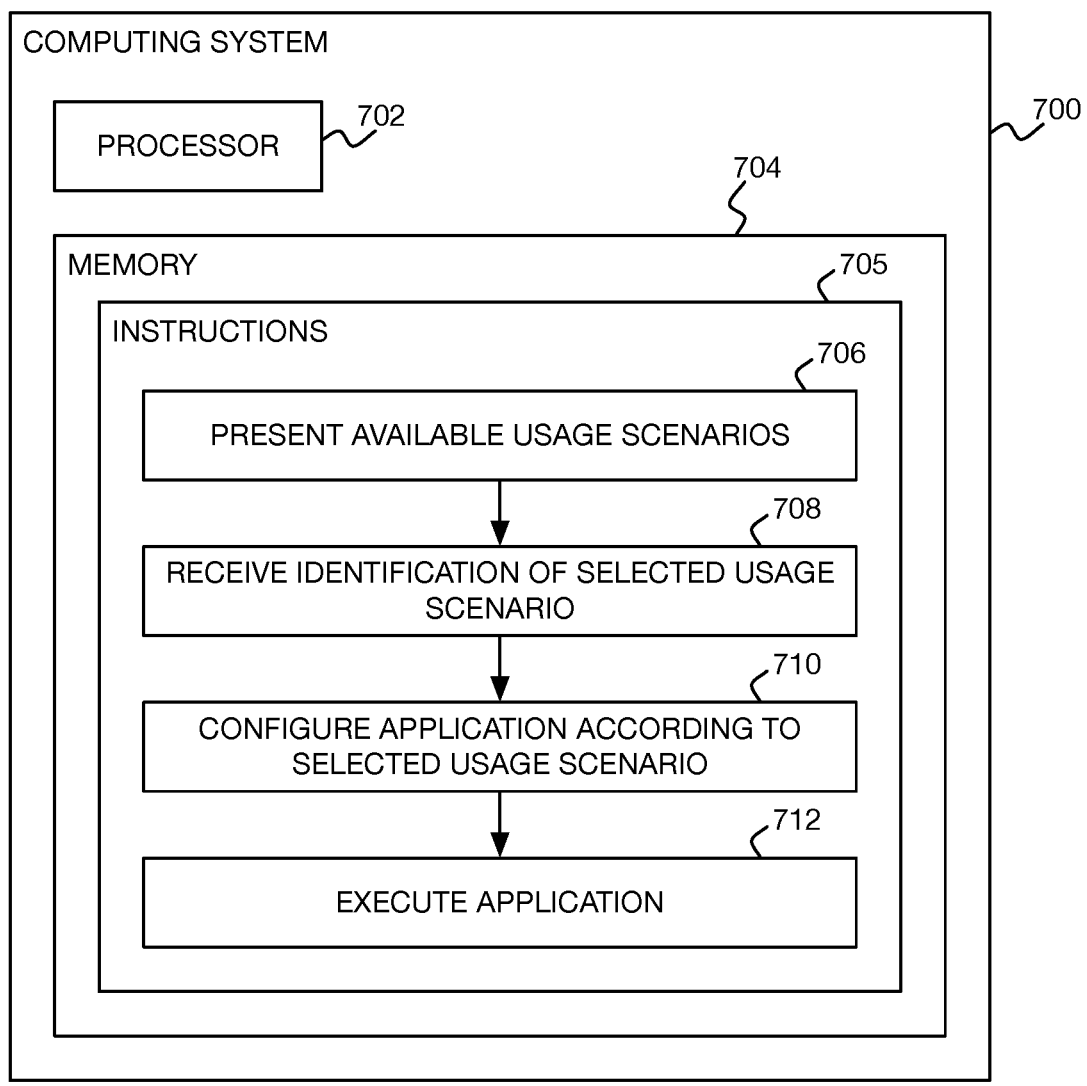
FIG. 8 is a diagram of an example computing system for configuring and executing an application in accordance with a selected usage scenario.

FIG. 8 shows an example computing system 700 for configuring and executing an application in accordance with a selected usage scenario, which can include the hard- and soft-partitioned usage scenarios that have been described, as well as a single-tenant usage scenario in which there is a single instance of the application for the sole tenant. The computing system 700 may be the computing system that is responsible for deploying the application instances per the selected usage scenario, for instance. The computing system may be or include a computing device such as a server, which is responsible for deploying the application instances on the same or different computing system.

The computing system 700 includes a processor 702 and a memory 704, which is an example of a non-transitory computer-readable data storage medium. The memory 704 stores instructions 705 executable by the processor 702 to perform processing. The processing can include presenting to an administrator of the provider the available usage scenarios in accordance with which an application may be configured (706).

The processing can include receiving identification of the administrator-selected usage scenario (708). The processing includes then configuring the application according to the selected usage scenario (710). For example, the application may be configured according to the selected usage scenario as has been described in relation to the method 600 of FIG. 7. The processing can further include then executing the application as has been configured (712). Such application execution thus permits usage of the application instances by the tenants of the provider.

Techniques have been described that permit an application to configured for usage in a variety of different usage scenarios, without having to rearchitect the application. In this respect, a hierarchical IDM model can be employed to permit such application configuration. The hierarchical IDM model itself can leverage the IDM models of the provider and the tenants of the provider. The provider IDM model and the tenant IDM models can be independent of whether the usage scenarios prescribe hard and/or soft partitioning, thus permitting the application to be used in a variety of different usage scenarios.

We claim:

1. A method comprising:
configuring an application managed by a provider to run according to a selected usage scenario of a group of usage scenarios and in accordance with a hierarchical identity management (IDM) model based on the selected usage scenario, the hierarchical IDM model including an IDM model of the provider that specifies users of the provider, the group of usage scenarios comprising:
a hard-partitioned usage scenario in which instances of the application are hard partitioned in correspondence with tenants of the provider; and
a soft-partitioned usage scenario in which the instances of the application are soft partitioned in correspondence with the tenants of the provider; and
executing the configured application,
wherein the hierarchical IDM model comprises a root node corresponding to the provider and child nodes directly under the root node and that correspond to the tenants of the provider.

2. The method of claim 1, wherein the group of usage scenarios further comprises a single-tenant usage scenario having a single instance of the application for a sole tenant.

3. The method of claim 1, wherein the provider is a software-as-a-service (SaaS) provider or a managed service provider (MSP), and the tenants are customers of the provider,
or wherein the provider is an entity, and the tenants are units of the entity.

4. The method of claim 1, wherein the hard-partitioned usage scenario is selected as either:
a first hard-partitioned usage scenario in which the instances of the application are logical instances of the application, or a second hard-partitioned usage scenario in which the instances of the application are physical instances of the application.

5. The method of claim 1, wherein the hard-partitioned usage scenario is selected as either:
   a first hard-partitioned usage scenario in which the tenants are respectively able to access but not modify operating environments of the tenants via the instances of the application, or
   a second hard-partitioned usage scenario in which the tenants are respectively able to both access and modify the operating environments of the tenants via the instances of the application.

6. The method of claim 1, wherein the selected usage scenario is the hard-partitioned usage scenario, and the tenants of the provider comprise a provider tenant, the method further comprising:
   configuring the instance of the application corresponding to the provider tenant according to a further hard-partitioned usage scenario in which the instance of the application corresponding to the provider tenant is further hard partitioned into sub-instances corresponding with sub-tenants of the provider tenant.

7. The method of claim 1, wherein the soft-partitioned usage scenario is selected as either:
   a first soft-partitioned usage scenario in which the tenants are unable to access or modify respective operating environments via the instances of the application,
   a second soft-partitioned usage scenario in which the tenants are able to access but not modify the respective operating environments via the instances of the application, or
   a third soft-partitioned usage scenario in which the tenants are able to both access and modify the respective operating environments via the instances of the application.

8. The method of claim 1, wherein the selected usage scenario is the soft-partitioned usage scenario, and the tenants of the provider comprise a provider tenant, the method further comprising:
   configuring the instance of the application corresponding to the provider tenant according to a further soft-partitioned usage scenario in which the instance of the application corresponding to the provider tenant is further soft partitioned into sub-instances corresponding with sub-tenants of the provider tenant.

9. The method of claim 1, wherein the root node comprises the IDM model of the provider that specifies the users of the provider.

10. The method of claim 9, wherein the selected usage scenario is the hard-partitioned usage scenario, and configuring the application comprises:
    configuring the instances of the application according to the IDM model of the provider.

11. The method of claim 10, wherein in the selected usage scenario, the tenants are respectively able to at least access respective operating environments via the instances of the application, and configuring the application further comprises:
    configuring the instances of the application according to respective IDM models of the tenants of the provider that each specify users of a corresponding tenant,
    wherein the child nodes directly under the root node comprise the respective IDM models of the tenants of the provider.

12. The method of claim 10, wherein in the selected usage scenario, the provider is able to have aggregated access to the respective operating environments via the instances of the application, and configuring the application further comprises:
    configuring a provider instance of the application according to the IDM model of the provider.

13. The method of claim 9, wherein the selected usage scenario is the soft-partitioned usage scenario, and configuring the application comprises:
    configuring the instances of the application and a provider instance of the application according to the IDM model of the provider; and
    assigning trinities governing user access to the instances to the instances of the application and the provider instance of the application,
    and wherein each trinity comprises:
       a specification of a user group;
       a specification of a zone of an operating environment managed via the instance to which the trinity corresponds; and
       a specification of security access of users of the user group to the zone.

14. The method of claim 13, wherein the specification of the security access of each trinity comprises role-based access control (RBAC).

15. The method of claim 13, wherein in the selected usage scenario, the tenants are respectively able to at least access respective operating environments via the instances of the application, and configuring the application further comprises:
    configuring the instances of the application according to respective IDM models of the tenants of the provider that each specify users of a corresponding tenant,
    wherein the child nodes directly under the root node comprise the respective IDM models of the tenants of the provider.

16. The method of claim 15, wherein configuring the application further comprises:
    specifying tags that each identifying an identical user among the respective IDM models of the tenants of the provider to support single sign-on (SSO).

17. The method of claim 13, wherein in the selected usage scenario, the tenants are further able to at least access respective operating environments via the instances of the application, and configuring the application further comprises:
    configuring access applications for the instances of the application by which tenant access the respective operating environments via the instances of the application.

18. The method of claim 1, wherein, in the hard-partitioned usage scenario, the instances of the application are separate copies of the application when physically hard partitioned and are logical instances of a single copy of the application when logically hard partitioned,
    wherein, in the soft-partitioned usage scenario, a provider instance of the application permits the provider to switchably access the instances corresponding to the tenants without having to log into and out of environments of the instances.

19. A non-transitory computer-readable data storage medium storing program code executable by a processor to perform processing comprising:

configuring an application managed by a provider to run according to a selected usage scenario of a group of usage scenarios and in accordance with a hierarchical identity management (IDM) model based on the selected usage scenario, the hierarchical IDM model including an IDM model of the provider that specifies users of the provider, the group of usage scenarios comprising:
- a hard-partitioned usage scenario in which instances of the application are hard partitioned in correspondence with tenants of the provider;
- a first soft-partitioned usage scenario in which the instances of the application are soft partitioned in correspondence with the tenants of the provider and the tenants are respectively unable to access or modify respective operating environments via the instances of the application;
- a second soft-partitioned usage scenario in which the instances of the application are soft partitioned in correspondence with the tenants of the provider and the tenants are respectively able to access but not modify the respective operating environments via the instances of the application; and
- a third soft-partitioned usage scenario in which the instances of the application are soft partitioned in correspondence with the tenants of the provider and the tenants are respectively able to access and modify the respective operating environments via the instances of the application, executing the configured application, wherein the hierarchical IDM model comprises a root node corresponding to the provider and child nodes directly under the root node and that correspond to the tenants of the provider.

20. A system comprising:

a processor; and a memory storing instructions executable by the processor to:
- configure an application managed by a provider to run according to a selected usage scenario of a group of usage scenarios by configuring the application in accordance with a hierarchical identity management (IDM) model based on the selected usage scenario; and executing the configured application, wherein the group of usage scenarios comprises:
- a hard-partitioned usage scenario in which instances of the application are hard partitioned in correspondence with tenants of the provider; and
- a soft-partitioned usage scenario in which the instances of the application are soft partitioned in correspondence with the tenants of the provider, wherein the hierarchical IDM model comprises a root node corresponding to the provider and child nodes directly under the root node and that correspond to the tenants of the provider.

* * * * *